United States Patent [19]

Phillips et al.

[11] Patent Number: 5,267,411
[45] Date of Patent: Dec. 7, 1993

[54] ANIMAL TRAP SYSTEM

[76] Inventors: Arthur J. Phillips, 21 Diamond St. Kellogg, Idaho 83837; Robert J. Phillips, R.D. #3, Box 220-D, Altoona, Pa. 16601

[21] Appl. No.: 959,554

[22] Filed: Oct. 13, 1992

[51] Int. Cl.⁵ .................... A01M 23/30; A01M 23/10
[52] U.S. Cl. .................................................. 43/81
[58] Field of Search .............. 43/81, 81.5, 82, 83, 43/63

[56]  References Cited
U.S. PATENT DOCUMENTS

| | | | |
|---|---|---|---|
| 1,290,697 | 1/1919 | Banash | 43/81 |
| 1,690,369 | 11/1928 | Harte | 43/81 |
| 1,992,353 | 2/1935 | Lattanach | 43/81 |
| 2,094,686 | 10/1937 | Stilson | 43/81 |
| 3,992,803 | 11/1976 | Kaiser | 43/83 |
| 4,127,958 | 12/1978 | Peters | 43/81 |
| 4,403,438 | 9/1983 | West Harron | 43/81 |
| 5,107,619 | 4/1992 | Zapata | 43/81 |
| 5,148,624 | 9/1992 | Schmidt | 43/81 |

*Primary Examiner*—Kurt C. Rowan
*Attorney, Agent, or Firm*—Andrew J. Cornelius

[57] ABSTRACT

A trap system includes a housing in which a conventional spring-loaded trap is mounted. The housing defines a rodent access through which the rodent enters the housing. Rodent bait secured to the trigger of the trap entices the rodent to travel to and activate the trap. Upon activation, the trapping bar of the trap pulls the activation indicator into the housing to indicate that trap activation has occurred. The trap system includes an obstructor that hinders inadvertent activation of the trap during shipping.

1 Claim, 2 Drawing Sheets

ANIMAL TRAP SYSTEM

BACKGROUND OF THE INVENTION

The present invention relates to the capture and control of small animals, and, more particularly, to the capture of such small animal pests as rodents.

It seems that mouse and rat traps have been around forever, and it also seems that mousetraps are a favorite focus of inventors. There remains, nonetheless, one particularly popular type of trap that is inexpensive and relatively effective. The trap includes a spring-loaded arm or bar that is released by a trigger mechanism when a rodent activates it. The rodent is prompted into performing this otherwise ill-advised act by rodent bait that has been secured to the trigger. The act of the rodent eating the bait from the trigger springs the trap.

Although this type of trap is effective in capturing, and usually killing, the rodent, the captured rodent usually does not present a particularly attractive picture. Considering also the health risk posed by the need to dispose of the rodent and the trap, the successful capturing of a rodent with a trap probably is viewed by many homeowners as a mixed blessing.

There is a need, therefore, to provide a rodent trap that spares the user direct confirmation of a successful rodent trapping mission by blocking the view of the captured rodent. There is also a need to provide a trap system that permits disposal of the captured rodent without handling the rodent itself or any part of the mechanism that has come into contact with the rodent.

Of course, if the user does not wish to view the trapping mechanism directly for fear of viewing the captured rodent, the user may wish to have an indicator that communicates to the user that the trap has been sprung. Without an indicator, the user may continue to use a trap that has already been sprung, but that has not captured a rodent, or, probably worse, one that is storing a captured rodent. Each possibility has its drawbacks.

A trap system that blocks the captured rodent from view, that permits more sanitary disposal of a trapped rodent, and that provides an indication that the trap has been sprung is obviously most attractive to those who wish to divorce themselves as much as possible from the rodent trapping and disposal process. In those cases, it would be useful to provide a trapping system with a trapping mechanism that is preset and, possibly, pre-baited at the factory. Unfortunately, since the trapping mechanism is spring-loaded and triggered by a mechanical trigger, the trapping mechanism can be sprung inadvertently by the rigors of shipping. It would be helpful, therefore, to provide an obstructor that would hinder activation of the trap until the obstructor is disabled by the ultimate user.

SUMMARY OF THE INVENTION

The present invention provides, therefore, an animal trap system that includes a trap for capturing a small animal in the housing in which the trap is located. The housing blocks a captured animal from view and defines an entrance that permits access by an animal to the trap. Preferably, the trap includes an obstructor that hinders activation of the trap. The obstructor can be disengaged by the user to prepare it for use. When used with a conventional spring-loaded trap that is activated by a trigger, the obstructor can be a member that extends through a small opening in the housing, one end of which is lodged under the trigger to hinder movement of the trigger. To prepare the trap system for use, the user simply pulls the obstructor from the housing.

Also preferably, the trap system includes an indicator that shows when the trap has been sprung or activated. When the trap is of the type that has a spring-loaded member that snaps to capture the rodent, one end of the indicator can be attached to the spring-loaded member. The remaining end of the indicator protrudes through the housing and is visible from the outside of the housing. When the trap is activated, the spring loaded member pulls the indicator into the housing, and the indicator is no longer visible from outside the housing.

BRIEF DESCRIPTION OF THE DRAWINGS

The following detailed description of the preferred embodiments can be understood better if reference is made to the drawing, in which.

DETAILED DESCRIPTION OF THE PREFERRED EMBODIMENTS

Figure 1:
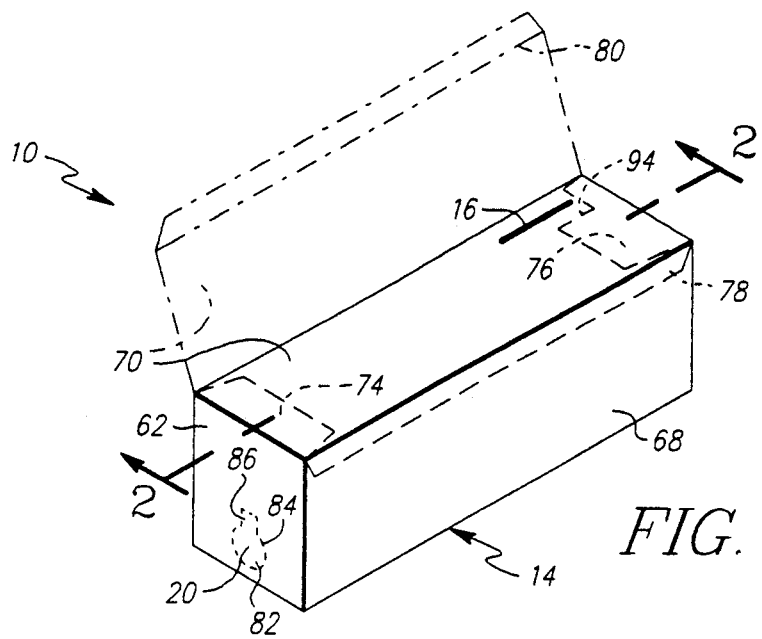
FIG. 1 shows a trap system provided by the invention, prepared for shipping, with an open housing shown in phantom.

The drawing shows a rodent trap system 10, which is the preferred embodiment of the present invention. System 10 is particularly suited for the capture of such small rodents as mice and rats. System 10 can be disposable or reusable.

Generally, system 10 includes a conventional trap 12 that has been baited with bait 24, a cardboard housing 14 in which trap 12 has been secured, a trap activation indicator 16, and a trap activation obstructor 18. Obstructor 18 prevents inadvertent activation of trap 12 during shipping. Obstructor 18 can be easily removed by the user to prepare system 10 for use.

Housing 14 is, preferably, a cardboard box that hides a trapped rodent from view and provides a convenient disposal receptacle that renders the disposal process aesthetically more acceptable and more sanitary. Housing 14 defines an access 20 that, when opened, provides to a rodent access to the interior of housing 14.

Trap 12 is the well-known and conventional spring-loaded trap that can be cocked and then activated by a trigger 22 by a rodent while eating bait 24 secured to the top of trigger 22. Indicator 16 is secured to the spring-loaded trapping bar 26 of trap 12 that actually captures and, hopefully, kills the rodent. Movement of trapping bar 26 from its cocked position (shown in FIG. 5) to its capturing position (shown in phantom in FIG. 6) causes indicator 16 to be pulled through opening 28 in housing 14 so that it is no longer visible from outside housing 14. Disappearance of indicator 16 from the exterior of housing 14 through opening 28 communicates to the user that trap 12 has been activated.

Figure 2:
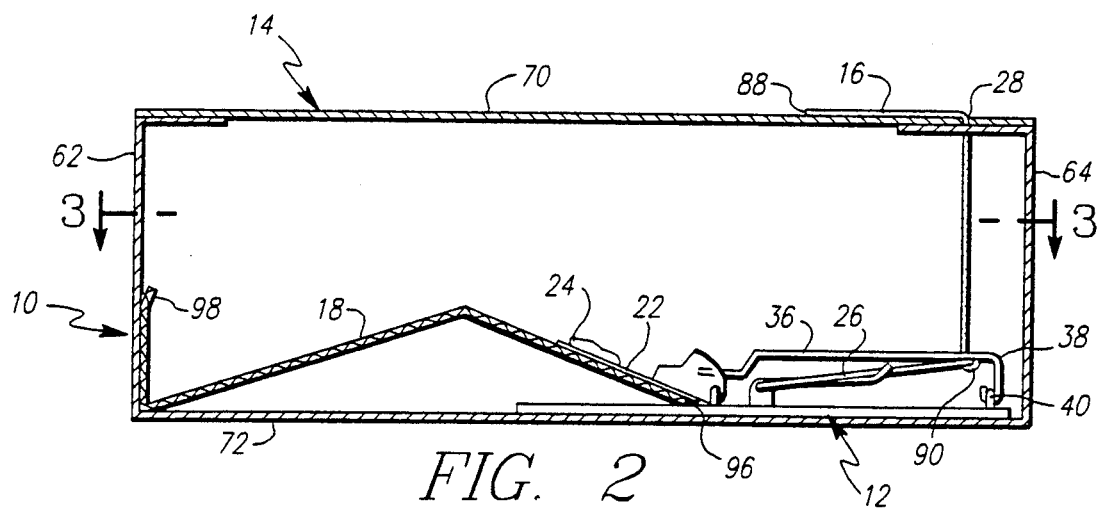
FIG. 2 is a sectional view of the system shown in FIG. 1, taken along the line 2—2.
Figure 3:
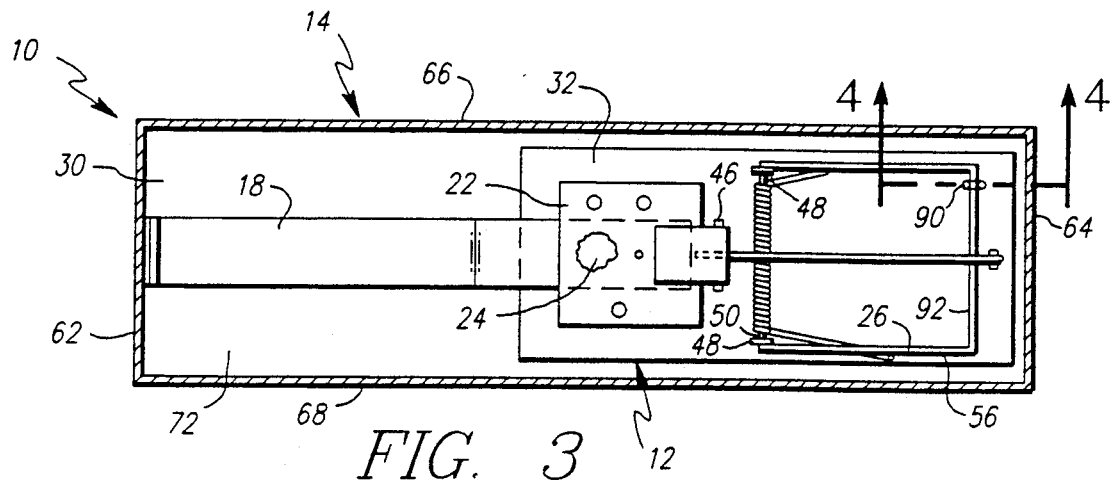
FIG. 3 is a sectional view of the system shown in FIG. 1, taken along the line 3—3 in FIG. 2.
Figure 4:
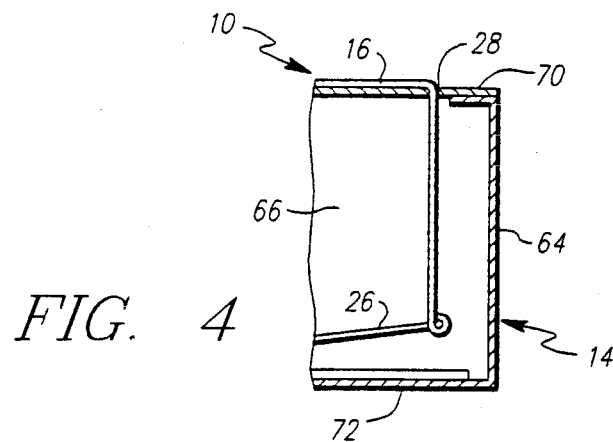
FIG. 4 is a sectional view of part of the system shown in FIG. 1, taken along the line 4—4 in FIG. 3.

FIGS. 1 through 3 show system 10 prepared for shipping to a retail outlet. Trap 12 is secured to floor 30 of housing 14. Trap 12 is conventional, and includes a trapping bar 26 that captures the rodent, a wooden base 32, a plastic trigger 22, a spring 34 and a catch 36. Catch 36 is formed from a length of wire of appropriate gauge, considering the size of trap 12 and the size of the rodent that trap 12 is intended to capture. One end 38 of catch 36 is formed into a loop, and is twisted around a "U-shaped" mount 40, whose legs have been embedded in base 32 of trap 12. Catch 36 can, therefore, pivot about mount 40. The remaining end 42 of catch 36 is provided with an offset that facilitates insertion of end 42 into a lip (not shown) of trigger 22 to cock or arm trap 12. The trigger mount 44 is conventional, and defines the lip, and is pivotally secured to base 32 by a wire 46 that passes through mount 44 and is embedded into base 32. Trapping bar 26 is pivotally secured to base 32 by a pair of wires 48, which also are embedded in base 32. Spring 34 is disposed around leg 50 of trapping bar 26. One end 52 of spring 34 bears against the upper surface of base 32, and the remaining end 54 of spring 34 is bent to cradle leg 56 of trapping bar 26. Bait 24 is secured to the upper surface of trigger 22. Accordingly, spring 34 tends to move trapping bar 26 in the direction shown by arrow 56 in FIG. 6 when a rodent exerts force on trigger 22. After activation of trap 12, bar 26 rotates in direction 58 until it is stopped by base 32 or something (like a mouse) that is interposed between bar 26 and base 32.

Trap 12 is cocked and armed in conventional fashion. Trapping bar 26 is rotated into the position shown in FIG. 5, and catch 36 is pivoted over top of trapping bar 26 and end 42 inserted under the lip formed in trigger mount 44 of trigger 22. Trapping bar 26 bears upward against catch 36 to force end 42 upward against the lip and hold it in place. With catch 36 in the position shown in FIG. 5, spring 34 cannot pivot trapping bar 26. Downward pressure on trigger 22 exerted, for example, by a rodent eating bait 24 rotates trigger 22 downwardly until end 42 of catch 36 is released from the lip of mount 44. Release of end 42 permits end 54 of spring 34 to push catch 36 upwardly, in the direction of arrow 60, and out of the way, and rotate trapping bar 26 in the direction shown by arrow 58 to capture the rodent.

Housing 14 defines two ends 62 and 64, two sides 66 and 68, a top 70 and a bottom on floor 72. Top 70 is a conventional box top that defines two side flaps 74 and 76 and a front flap 78, flaps 74, 76, and 78 are inserted into housing 14 to close housing 14 in the conventional fashion. As with other conventional cardboard box tops, top 70 can define a pair of slits at either end of fold 80 to permit flaps 74 and 76 to engage top 70 and more securely close housing 14.

Rodent access 20 is provided in end 62 of housing 14. Housing 14 is preferably a cardboard box. Access 20 is formed by defining an access closure 82 with perforations 84 made in end 62 of housing 14. Closure 82 seals housing 14 during shipping. Opening of access 20 to prepare system 10 for use is accomplished by tearing perforations 84 and removing closure 20. Access closure 82 also acts as a mounting for obstructor 18. Access closure 82 defines a tab 86 that can be separated from housing 14 to facilitate removal of the remainder of closure 82 from housing 14.

Top 70 of housing 14 defines a indicator opening 28 through which end 88 of indicator 16 extends from the interior of housing 14 when trap 12 is cocked and armed. End 88 can be folded against top 70 as shown in FIG. 2 for ease of shipping. During shipping and normal use of system 10, top 70 of housing 14 is closed.

Preferably, indicator 16 is a pipe cleaner, end 90 of which is twisted around leg 92 of trapping bar 26 to secure indicator 16 to trapping bar 26. End 88 of indicator 16 is bent to the vertical position shown in FIG. 5 to prepare system 10 for use. Extension of end 88 from housing 14 indicates that trap 12 has not been activated, and remains cocked and armed. Flap 76 defines an offset 94 that allows insertion of end 88 through opening 28 of top 70 without the need to provide flap 76 with a opening through which end 88 would pass. Upon activation of trap 12, trapping bar 26 rotates toward trigger 22, pulling end 88 of indicator 16 through opening 28 and into housing 14 to provide a visual indication of activation of trap 12. That is, indicator 16 indicates that trap 12 has been activated when end 88 is not visible.

Obstructor 18 preferably is made from a fairly stiff length of corrugated cardboard that is bent to form an inverted, and shallow "V." As shown in FIG. 2, one end 96 of obstructor 18 is lodged between trigger 22 and the top of base 32 after trap 12 has been cocked and armed, as shown in FIG. 2, and the other end 98 of obstructor 18 is secured to the inside of closure 82 to secure trap 12 during shipping. It is important to wedge end 96 securely in place against the bottom of trigger 22 to inhibit downward movement of trigger 22, and hinder activation of trap 12. It is also important that obstructor 18 be mounted in the inverted "V" position rather than the non-inverted, or normal "V" position. If obstructor 18 were mounted in the "V" position, obstructor 18 would not bear against the bottom of trigger 22 to resist downward movement of trigger 22. Further, removal of obstructor 18 through access 20 could itself cause activation if obstructor 18 were mounted in the "V" position.

Housing 14 can be fabricated using any suitable process, including conventional processes used to create cardboard boxes. Trap 12 is baited by gluing or otherwise securing rodent bait 24 to the top surface of trigger 22. Base 32 of trap 12 is secured to the end of floor 72 of housing 14 that is nearest end 64 of housing 14, opposite access 20. Base 32 is secured to floor 72 by gluing or any other suitable means. End 96 of obstructor 18 is wedged under trigger 22, as described above, and end 98 is bent and glued or otherwise secured to the inner surface of closure 82. End 90 of indicator 16 is wrapped around leg 92 of trapping bar 26 to secure indicator 16 to trap 12. The remaining end 88 of indicator 16 is inserted through opening 28 of housing 14. Top 70 is closed, and end 88 of indicator 16 is flattened against top 70. System 10 is then ready for shipping.

Figure 5:
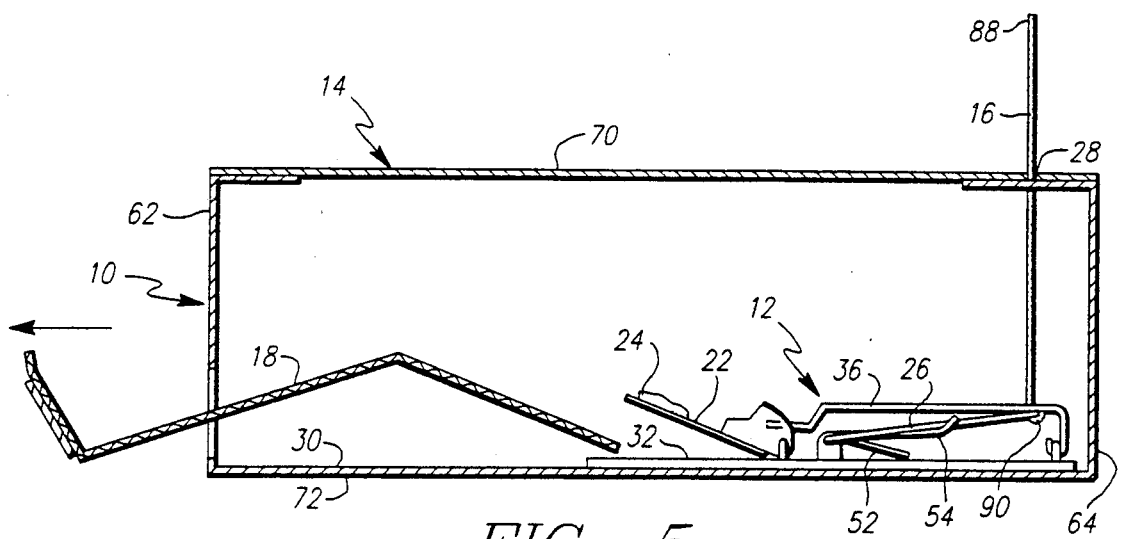
FIG. 5 shows the system depicted in FIG. 1, which is being prepared for use.
Figure 6:
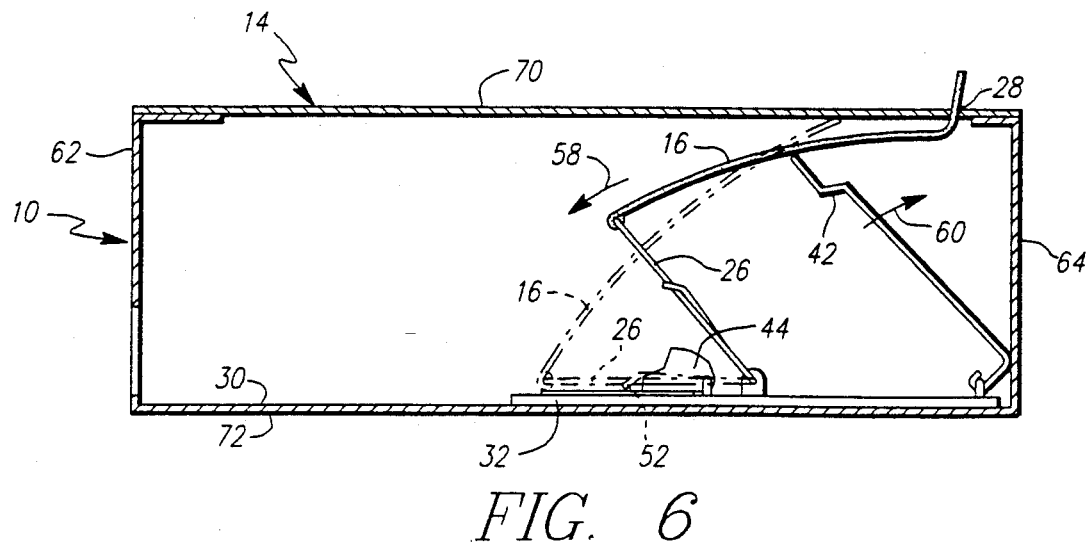
FIG. 6 shows the system depicted in FIG. 1, in which the trap is in the process of being activated, and in which the activated position of the trap is shown in phantom.

When the user wishes to prepare trap system 10 for use, end 88 of indicator 16 is straightened generally to the position shown in FIG. 5, which indicates that trap 12 has not been activated. Access closure 82 is separated completely from housing 14 by tearing perforations 94. Obstructor 18 is carefully pulled from housing 14 using closure 82 and end 98 of obstructor 18. Trap system 10 then is ready to capture a rodent. Trap 12 captures a rodent when the rodent enters housing 14 through rodent access 20 and activates trap 12 as it eats bait 24.

In checking trap system 10 for activation, the user will know that trap 12 has not been activated if indicator 16 remains extended from the housing through indicator opening 28. If, however, indicator 16 does not extend from housing 14, the user knows that trap 12 has been activated. The user can simply throw the entire trap system 10 away at that point, or the user can open housing lid 70 to check the contents of housing 14. If the user wishes to reuse trap 12, whether or not a rodent has been captured, trap 12 and indicator 16 can be reset in the same manner as they were set originally at the factory.

Clearly, trap system 10 and its components can be appropriately sized and shaped to trap different types of animals or rodents. Trap system 10 provides, therefore, a convenient and more sanitary approach to the capturing and disposal of animals, especially small pests and rodents.

What is claimed is:

1. An animal trap system comprising:
   a trap for capturing a small animal;
   a housing in which said trap is disposed that blocks from view an animal captured by said trap, said housing defining a housing entrance for an animal;
   a trigger that activates said trap when force is applied against said trigger at a level sufficient to move said trigger through at least a predetermined distance;
   a disengageable obstructor that hinders movement of said trigger through said predetermined distance when said obstructor is engaged with said trap, said obstructor being disengageable from said trap to permit activation of said trap;
   said obstructor being capable of being withdrawn from said housing through said housing entrance to facilitate operation of said trigger;
   said obstructor being a bent length of material, one end of which is located under said trigger to hinder movement of said trigger.

* * * * *